No. 884,417. PATENTED APR. 14, 1908.
A. C. E. RATEAU.
PROCESS OF UTILIZING HOT LIQUIDS FOR POWER PURPOSES.
APPLICATION FILED AUG. 11, 1906.
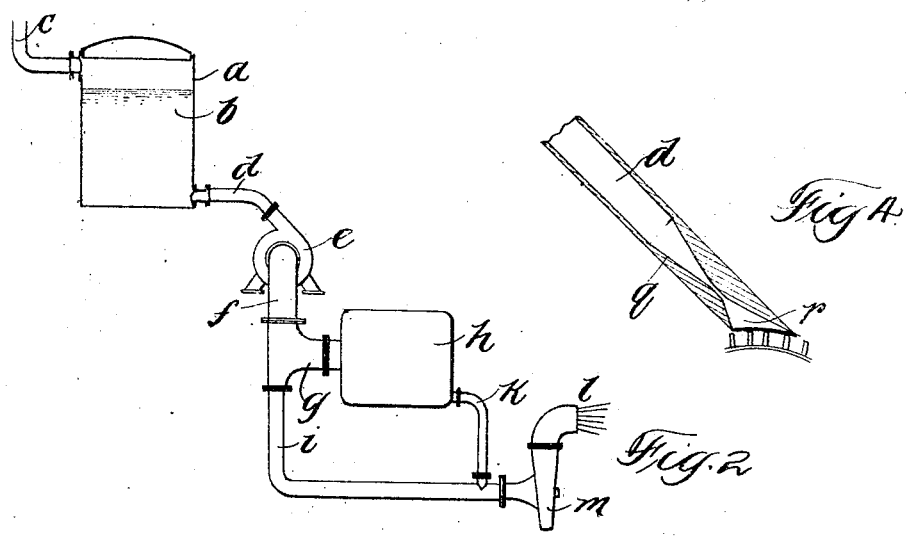
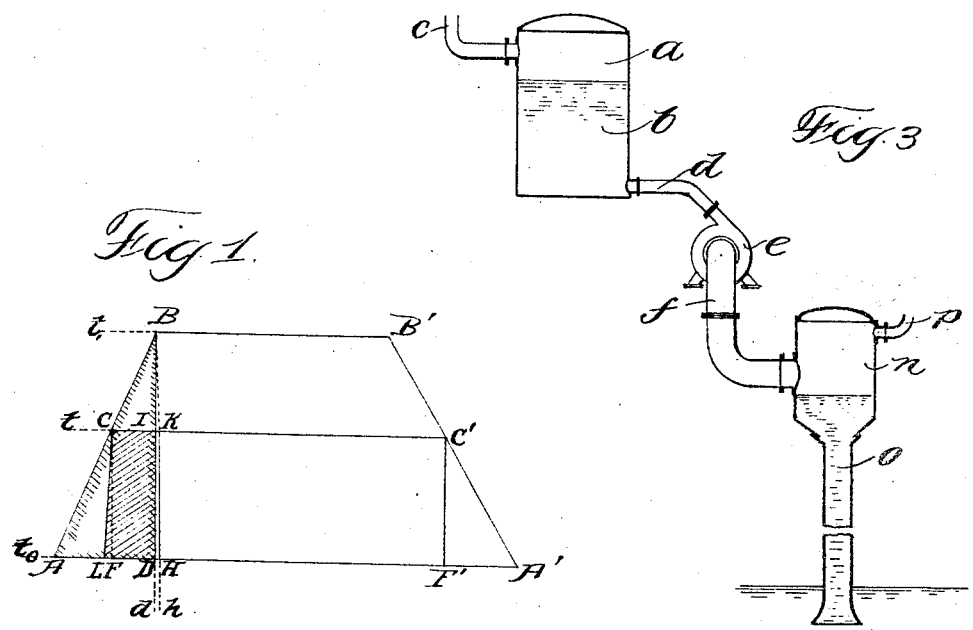
Witnesses:
Leon F. Stroh
J. B. Hill
Inventor,
A. C. E. Rateau,
By G. L. Cragg
Attorney

UNITED STATES PATENT OFFICE.

AUGUSTE CAMILLE EDMOND RATEAU, OF PARIS, FRANCE.

PROCESS OF UTILIZING HOT LIQUIDS FOR POWER PURPOSES.

No. 884,417.

Specification of Letters Patent.

Patented April 14, 1908.

Application filed August 11, 1906. Serial No. 330,142.

*To all whom it may concern:*

Be it known that I, AUGUSTE CAMILLE EDMOND RATEAU, citizen of France, residing at Paris, France, have invented a certain new and useful Improvement in the Process of Utilizing Hot Liquids for Power Purposes, of which the following is a full, clear, concise, and exact description, reference being had to the accompanying drawings, forming a part of this specification.

My invention relates to a method of obtaining mechanical energy from hot liquids.

My invention enables the employment of hot water, that so commonly goes to waste, for industrial purposes, such as waters that are obtained from natural sources, as hot springs, water of condensation, water in the jackets of gas engines, compressors, etc. Hot water from most any source may, in accordance with my invention, be utilized to perform mechanical work, the invention enabling the attainment from the water of the maximum available mechanical power.

In accordance with my invention, I effect the liberation of steam from the water before the water has access to the motive element, such as a water-wheel, the steam, when liberated, being free to expand and thereby effect the more forceful flow of the water. In order to effect the liberation of the steam, in order that it may thus forcibly act upon the water, I desirably constrict the size of the flowing stream of water, the steam thereupon being liberated and thereupon desirably enlarge or taper, preferably gradually, the size of the flowing stream, so that the liberated steam may have free action by expansion in accelerating the flow of the water. The instrument that I prefer to employ for practicing these steps in my improved method, resides in a nozzle which at its discharge end first converges and thereafter diverges. I mention steam as an example, though it is obvious that any fluid capable of evaporating will answer the purpose. I use the term "vapor" in the claims in the broad sense, therefore.

A condensing device is desirably employed at the discharge end of the water-wheel so as to provide a drop in pressure, to which corresponds a drop in temperature. The drop in temperature represents the major part of the source of energy. I do not wish to be limited in all practices of my invention to the condensing operation.

I effect formation of steam from the water and cause its removal, to which end I employ a device for securing a low pressure at the point of egress of the water from the wheel (or other power translating instrumentality). I prefer for such an instrumentality a condenser, the water wheel being desirably interposed between the condenser and the source of water supply. This condenser is in free communication with the pipe or duct leading from the water wheel and is therefore reachable as it passes through the wheel. I preferably begin the separation of the steam and water before their exit through the wheel, to which end a suitably designed induction nozzle is interposed between the water wheel and the water supply, and as the space afforded in the water wheel is considerably larger than the pipe that conveys the water to the water wheel, expansion of the steam into this larger space is permitted, the steam after it is exhausted from the water wheel being condensed as aforesaid.

While I prefer the instrumentalities and their relative arrangement particularly specified, I do not wish to be limited in all embodiments of my invention to the same.

I will explain my invention more fully by reference to the accompanying drawing, in which—

Figure 1 is an entropic diagram employed in demonstrating the utility of the invention. Fig. 2 is a diagram illustrating one arrangement of apparatus. Fig. 3 indicates a modified arrangement of the apparatus shown in Fig. 2. Fig. 4 is a view illustrating the form of nozzle that is desirably employed for directing the hot water to the water wheel.

Like parts are indicated by similar characters of reference throughout the different figures.

Referring first more particularly to Fig. 2, a suitable vessel $a$ may be employed that contains the hot liquid $b$, usually water, which may be provided in any suitable way or from any suitable source, and which is most economically used in the practice of my invention when it has a temperature in the neighborhood of two hundred and twelve degrees Fahrenheit or less.

The invention is not to be restricted to the utilization of water in the neighborhood of two hundred and twelve degrees Fahrenheit, for it will be operative to commercial advantage with the water at much less and at considerably greater temperatures. A pipe $c$ is shown, for purpose of illustration, as communicating with the top of the vessel $a$ for renewing the supply of liquid within the vessel. The liquid, for economical reasons, is desirably subject to pressure approximating atmospheric pressure, though the invention is not to be restricted to such a pressure. An eduction pipe $d$ communicates with the interior of a suitable motor or power translating device, as a water wheel $e$. Piping $f$ communicates with the water wheel outlet. This piping $f$ is desirably of larger diameter than the piping $d$, and the space afforded within the water wheel is also larger than that afforded by the piping $d$, so that the fluid may expand within the water wheel in order that a part of it may become steam and the two bodies of fluid, the water and the steam, issuing from the outlet of the water wheel may pass through the piping $f$, the steam branching through the piping $g$ where it is subjected to the action of the condenser $h$, while the water will flow through the piping $i$. I prefer to subdivide the steam and water at $g$ and $i$, but I do not wish to be limited to this practice. The steam after being condensed in the condenser $h$ flows through the piping $k$, the water issuing from the piping $i$—$k$ finding exit at $l$. A pump $m$ may be employed to promote the discharge of the water at $l$.

The equipment shown in Fig. 3 is generally similar to that shown in Fig. 2 and similar parts are given the same characters of reference. In the arrangement shown in Fig. 3, however, the piping $f$ communicates with a separating chamber $n$ located at the top of and communicating with a barometric column $o$ which receives the water, the steam passing through the piping $p$ to a condenser for the purpose that has been specified.

In Fig. 4 I have shown the preferred device for leading the hot water to the water wheel. The piping $d$ desirably converges at $q$ toward the wheel and then diverges at $r$ toward the wheel, the passage through which the water flows being thus constricted, the constriction being reduced just before the water enters the wheel. By this construction the water pressure is transformed into velocity and the water is properly entered within the wheel to promote the liberation of steam under the influence of the vacuum obtained in the piping $f$ owing to the influence of the condenser. The shape of the piping at $q$—$r$ is to be determined according to the circumstances attending each equipment.

By means of my invention I am enabled to obtain maximum available mechanical power from hot water.

In order that the advantages of my invention may be more scientifically set forth, I will now refer to Fig. 1.

Let us call A B A¹ B¹ the entropic diagram of the water and of the saturated steam, considered between the temperatures $t_1$ of the hot water and $t_0$ of the condenser. In the systems of primary vaporization hitherto actually employed, the temperature of the water is lowered to a certain point $t$ which is located between $t_1$ and $t_0$ in the scale of temperatures. It will be seen from the diagram that from each pound of water utilized, there can be produced at this temperature $t$ and under the corresponding pressure $p$ a weight of $x$ pound of steam, which can be expressed by the proportion $\frac{C K}{C C_1}$. (The point K is located on the right hand side of the adiabatic in such a manner that the rectangle I K $d$ $h$ going as far as the line of absolute temperature zero degree, has an equivalent surface to the triangle C B I. The two points I—K are extremely close to each other and the distance I K can be practically considered as 0). The energy available in a pound of steam between the temperature $t_0$ and a temperature $t_1$ is expressed by the surface of the trapezoid C C¹ F¹ A. It is then obvious that the energy available in the weight, $x$ pounds, will be expressed by the surface C K L H, the point L being located between A F in such a manner that we obtain $\frac{L F}{A F} = \frac{C K}{C C_1}$.

In order to determine the maximum of the surface C K H L, it will be found that this maximum takes place for a temperature $t$ practically equal to the arithmetic mean between $t_0$ and $t_1$, and that in this case the surface C K L H is approximately equal to one-half of the surface A B D. This surface A B D represents the energy available when a pound of water at the temperature $t_1$ is brought down to a temperature $t_0$. From this we see that the maximum power which can be theoretically produced by utilizing hot waters by the present process, is not over a half of the energy that could be obtained theoretically in utilizing directly these hot waters in accordance with my invention.

In accordance with my process, I obtain the lower temperature $t_0$ by creating a corresponding vacuum in a reservoir or condenser toward which the hot water flows from the vessel $a$ in such a manner that under the influence of the difference of pressures thereby obtained, the hot water will flow rapidly and the vis viva resulting from this speed can be translated by suitable apparatus for the performance of mechanical work. The water being under the action of the mean pressure, acquires speed and at the same time is transformed partially into steam which is finally condensed when the mixture of water and steam have passed from the water wheel. Owing to the fact that the water will have a partial vaporization at the distributing nozzle $q$—$r$, it is desirable to converge and diverge the nozzle as hitherto-specified. By means of my invention the total available heat in the water may be utilized and to the extent of the exhaust temperature which corresponds to the obtainable vacuum. Moreover, if there is a difference in the level between the distributing reservoir a and the tank receiving the exhaust water, the work of gravity will supplement the work of the heat.

The water wheel, as is well known, has a mechanical efficiency a great deal higher than steam engines. In view of the fact that the water wheel will rotate in a space where the pressure is very low, the frictions of the wheel in the fluid will be reduced to a minimum.

In the practice of my invention the hot waters are preferably not especially heated for the purpose of the invention, though occasion may arise when it would be serviceable to heat waters especially for the practice of the invention. To this end, I may use, as hitherto stated, waters from hot springs, hot waters obtained in laundries, dyeing establishments, etc.

Exhaust steam might be utilized to heat water which may thereafter be subject to the practice of my invention.

I have used the expressions "extracting vapor" "removing vapor," etc., by which expressions I do not limit myself to the passage of the vapor to the exterior of the channel containing the liquid. By these expressions I mean the disappearance of the vapor in any manner, as by transmitting it into liquid by the action of the condenser, so that it will not act as an obstruction to the flow of the liquid.

While I have shown the preferred ways of practicing my invention, I do not wish to be limited thereto.

Having thus described my invention, I claim as new and desire to secure by Letters-Patent:

1. The process of effecting the flow of hot liquid, which consists in confining the liquid in its flow to a suitable channel, effecting the separation of vapor from the liquid, permitting the expansion of the separated vapor, and causing the vapor in its expansion to act upon the liquid.

2. The process of effecting the flow of hot liquid, which consists in confining the liquid in its flow to a suitable channel, constricting the flow of the liquid, thereby to effect the separation of vapor therefrom, permitting the expansion of the separated vapor, and causing the vapor in its expansion to act upon the liquid.

3. The process of effecting the flow of hot liquid, which consists in confining the liquid in its flow to a suitable channel, constricting the flow of liquid, thereby to effect the separation of vapor therefrom, thereafter enlarging the stream of liquid to permit the liberated vapor to expand, and causing the vapor in its expansion to act upon the liquid.

4. The process of effecting the flow of hot liquid, which consists in confining the liquid in its flow to a suitable channel, effecting the separation of vapor from the liquid, permitting the expansion of the separated vapor, causing the vapor in its expansion to act upon the liquid, and thereafter condensing the vapor.

5. The process of effecting the flow of hot liquid, which consists in confining the liquid in its flow to a suitable channel, constricting the flow of the liquid, thereby to effect the separation of vapor therefrom, permitting the expansion of the separated vapor, causing the vapor in its expansion to act upon the liquid, and thereafter condensing the vapor.

6. The process of effecting the flow of hot liquid, which consists in confining the liquid in its flow to a suitable channel, constricting the flow of liquid, thereby to effect the separation of vapor therefrom, thereafter enlarging the stream of liquid to permit the liberated vapor to expand, causing the vapor in its expansion to act upon the liquid, and thereafter condensing the vapor.

7. The process of effecting mechanical movement, which consists in confining the liquid in its flow to a suitable channel, effecting the separation of vapor from the liquid, permitting the expansion of the separated vapor, causing the vapor in its expansion to act upon the liquid, and subjecting a motive element to the action of the liquid.

8. The process of effecting mechanical movement, which consists in confining the liquid in its flow to a suitable channel, constricting the flow of the liquid, thereby to effect the separation of vapor therefrom, permitting the expansion of the separated vapor, causing the vapor in its expansion to act upon the liquid, and subjecting a motive element to the action of the liquid.

9. The process of effecting mechanical movement, which consists in confining the liquid in its flow to a suitable channel, constricting the flow of liquid, thereby to effect the separation of vapor therefrom, thereafter enlarging the stream of liquid to permit the liberated vapor to expand, causing the vapor in its expansion to act upon the liquid, and subjecting a motive element to the action of the liquid.

10. The process of effecting mechanical movement, which consists in confining the liquid in its flow to a suitable channel, effecting the separation of vapor from the liquid, permitting the expansion of the separated vapor, causing the vapor in its expansion to act upon the liquid, thereafter condensing the vapor, and subjecting a motive element to the action of the liquid.

11. The process of effecting mechanical-movement, which consists in confining the liquid in its flow to a suitable channel, constricting the flow of the liquid, thereby to effect the separation of vapor therefrom, permitting the expansion of the separated vapor, causing the vapor in its expansion to act upon the liquid, thereafter condensing the vapor, and subjecting a motive element to the action of the liquid.

12. The process of effecting mechanical movement, which consists in confining the liquid in its flow to a suitable channel, constricting the flow of liquid, thereby to effect the separation of vapor therefrom, thereafter enlarging the stream of liquid to permit the liberated vapor to expand, causing the vapor in its expansion to act upon the liquid, thereafter condensing the vapor, and subjecting a motive element to the action of the liquid.

In witness whereof, I hereunto subscribe my name this twenty-sixth day of June A. D., 1906.

AUGUSTE CAMILLE EDMOND RATEAU.

Witnesses:
HANSON C. COXE,
JACK BAKER.